April 21, 1964 C. ROTT 3,130,257

STITCHED CIRCUIT BOARD AND METHOD OF MAKING

Filed Oct. 25, 1962

INVENTOR
C. ROTT

BY [signature]
ATTORNEY

United States Patent Office 3,130,257
Patented Apr. 21, 1964

3,130,257

STITCHED CIRCUIT BOARD AND METHOD OF MAKING

Clarence Rott, Indianapolis, Ind., assignor to Western Electric Company, Incorporated, New York, N.Y., a corporation of New York Filed Oct. 25, 1962, Ser. No. 233,077
6 Claims. (Cl. 174—68.5)

This invention relates to a circuit board and to a method of making the same. It is an object of the invention to provide an improved product and method of such nature.

Printed circuits, while still a relatively new development, have received widespread acceptance by manufacturers of electrical and electronic equipment. Such acceptance is a result of the savings in time, cost, and space requirements per unit made possible when printed circuits are used in place of wire connected circuits. However, as in any new art, certain problems have continued to exist which hinder both the development and the application of printed circuitry techniques. One of these has been the lack of a practical method whereby printed circuit boards containing a prescribed circuit pattern may be produced in small numbers at a low unit cost. Methods permitting a low unit cost require a large investment whereby low unit cost is actually realized only in the case of large scale production. Alternatively, methods requiring little investment involve substantial per unit cost. Thus, existing printed circuitry techniques, while highly satisfactory in many instances, are incapable of producing small numbers of low cost circuit boards.

Accordingly, it is an object of the invention to provide a circuit board capable of being produced in small numbers at a low unit cost.

It is a further object of the invention to provide a new and improved method by which such a circuit board may be produced.

It is a still further object of the invention to provide a sturdy circuit board, being either flexible or rigid in nature, which can utilize a wide variety of relatively inexpensive materials as insulating material while allowing easy insertion of component leads.

In accordance with the present invention, a circuit board is formed by sewing a conductive strand to an insulating sheet in zigzag stitches and applying a conductive film to the board to form conductive webs between adjacent stitches.

The invention, together with further objects and advantages thereof, will best be understood by reference to the following description taken in connection with the accompanying drawings in which.

Figures 1, 2:
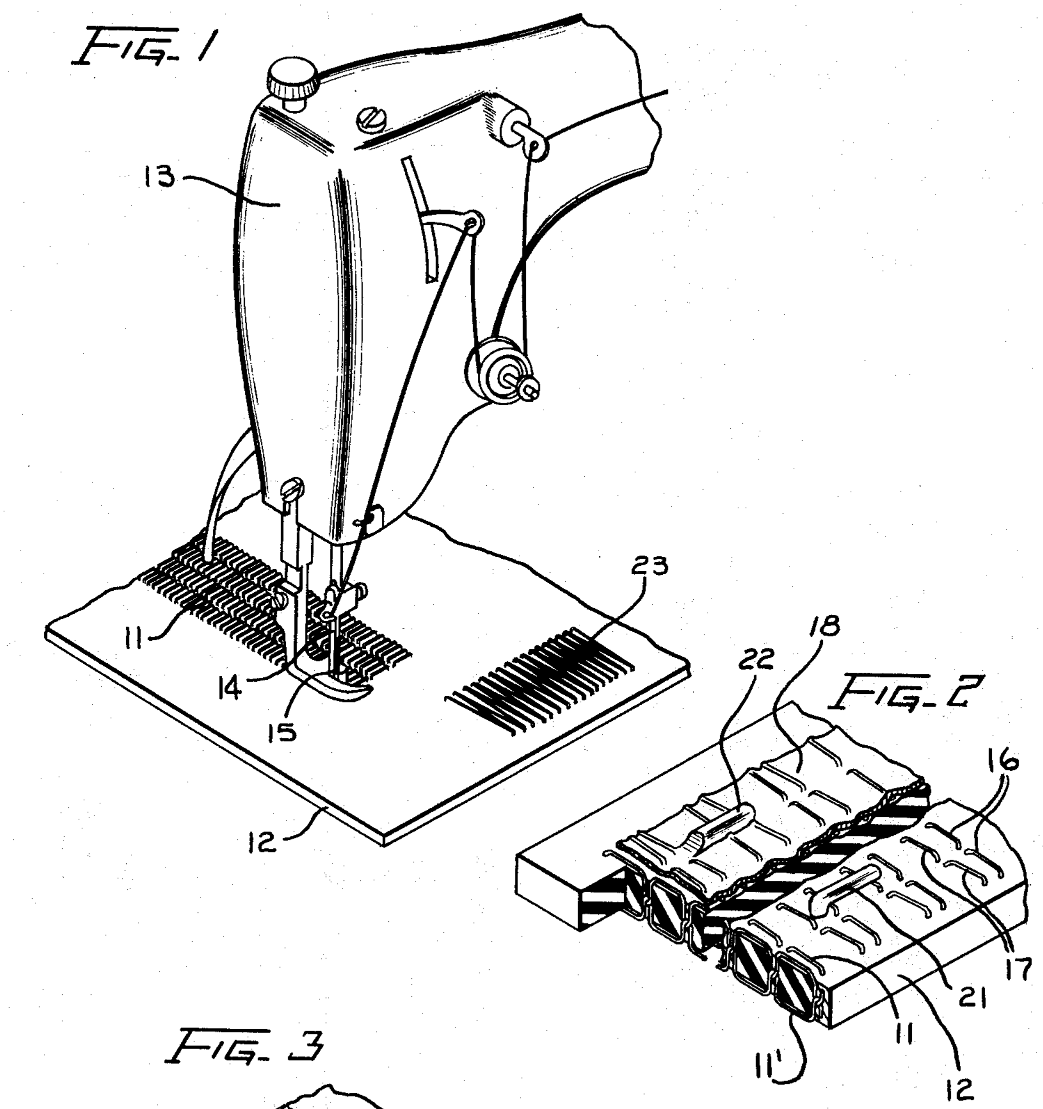
FIG. 1 is a perspective view of a sewing machine and circuit board illustrating a method by which a conductive strand may be attached to an insulating sheet in practicing the present invention.
FIG. 2 is a partial perspective view of the circuit board, of which a portion is shown completed, and another portion is shown with conductive material removed in the interest of better understanding.

In the embodiment of the invention shown in the drawings, construction of a circuit board is initiated by stitching a conductive strand 11 to an insulating sheet 12. The insulating sheet 12, while shown flat and apparently rigid, may be of any shape or flexibility, the flexibility and shape being entirely dependent upon the requirements of the intended use of the circuit board. Regardless of its final shape or stiffness, however, the sheet 12 should initially be sufficiently soft or flexible to permit stitching of the conductive strand 11.

Paper or cloth, impregnated with suitable polyesters, epoxies, or phenolics are well suited for practicing the present invention since, although initially quite flexible, they may be cured after stitching to impart any desired degree of rigidity to the insulating sheet by utilizing the thermosetting properties of the impregnating resins. Naturally, if a completely flexible product is desired, the paper or cloth may be used without treatment. Of course, the choice of sheet material is not limited to naturally flexible materials, but may also include materials having thermoplastic characteristics since such materials may be made sufficiently flexible by application of heat.

As seen in FIG. 1, the conductive strand 11 is stitched by a heavy duty or industrial sewing machine 13 adapted to sew the particular type of strand 11 which is used. The type of machine required is, of course, dependent upon the nature of both the conductive strand 11 and the base 12. For example, a relatively stiff base material may require a special cutting blade on the needle 14 of the sewing machine. In this case, the groove 15 in the needle 14 can be made longer and deeper than is conventional to provide adequate protection against shearing of the strand while the needle is passing through the insulating sheet, all as is well known in the art.

Since the conductive strand 11 is to be attached in a sewing operation, it must be strong enough and flexible enough to withstand the stresses incurred during the operation. While a conventional fine drawn copper strand is well adapted for use here, various forms of metallized thread may serve. Such threads, well known in the art, may be formed by depositing a sheath of conductive material around a nonconductive strand.

The stitch formed in the attachment of the strand 11 to the base 12 is preferably a conventional stitch commonly characterized as a zigzag stitch. Its use in practicing the present invention is explained best by reference to FIG. 2. Note that adjacent stitches or passes 16 and 17 of the stitch are a short distance apart over their entire length. This means that when a conductive film 18 is applied between these passes, it can form conductive webs since it must bridge only small gaps between adjacent stitches. The film 18 thus creates a continuous conductive path having a width substantially equal to the length of the passes 16 and 17. The only restriction which need be placed on the spacing of the stitched pattern is that adjacent passes be close enough to allow easy bridging by the conductive film.

The length of the exposed threads in each of the passes is a matter of choice and may be varied from several short lengths per pass to one length per pass as shown at 23 in FIG. 1. It should be recognized that the term "passes" is interchangeable with the term "stitches." Wherever referred to within this paper, the use of the plural term "stitches" shall be synonymous with "passes" while the singular term "stitch" shall be used to characterize the overall pattern of the attached thread.

It should be noted that the conductive path is initially defined by sewing the desired path, using two separate threads as in a normal sewing operation. However, in accordance with custom, only one, namely the conductive strand 11, shall be referred to. Therefore, any reference to the strand 11 shall imply the presence of a holding strand 11' shown in section in FIG. 2. It will be appreciated that since this holding strand 11' may be conductive or nonconductive depending upon the wishes of the user.

Figure 3:
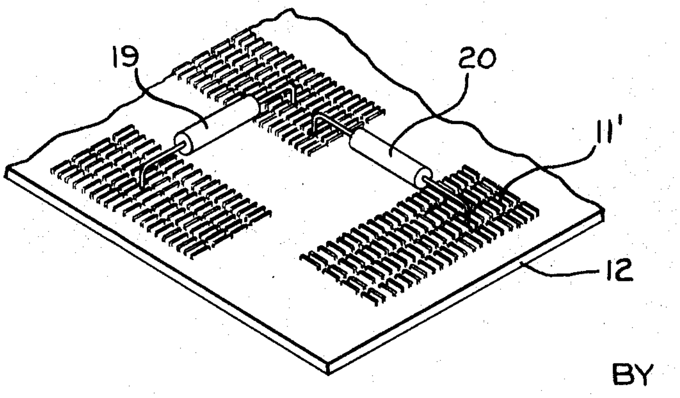
FIG. 3 is an enlarged sectional view of one portion of the underside of the circuit board of FIG. 1 showing the construction in greater detail.

Components 19 and 20 of FIG. 3 may be mounted by punching their leads through the insulating sheet and then bending them against the conductive path as shown at 21 in FIG. 2 while the board is still flexible and before the conductive film is applied. Little accuracy in necessary in this operation since adequate contact will exist as long as the leads of the components are bent against any part of the broad path formed by the conductive strand. After the components are positioned, the board may be cured to any desired degree of rigidity, and in any desired shape, in preparation for the application of the conductive film. It will be appreciated that, with the proper combination of materials, the film may be applied before the board is cured. Such a sequence may be desirable in various situations except where these two steps are specifically stated herein as being in a particular sequence, it is intended that the sequence be considered as interchangeable.

The conductive film 18, applied to the upper side of the board as shown in FIG. 2, may be a metallic solder, applied while molten, by dipping, spraying, rolling, or by use of a solder fountain. Conductive paste, well known in the art, may also be selectively applied to form the desired circuit pattern. Selective application is not necessary when molten solder is employed since the solder will adhere only to the metallic portions of the board, i.e., the path formed by the conductive strand. Good electrical contact between component leads and the conductive path is assured since projecting leads are encompassed by the film as shown at 22 in FIG. 2.

The proposed circuit board possesses a number of advantages over boards previously employed. The use of flexible materials greatly facilitates the insertion of component leads, while the manner in which the conductive paths are formed allows a wide variety of relatively inexpensive materials to be used in the insulating bases. The circuit board formed is rugged in construction, and unlike many prior art boards, can withstand a substantial amount of flexing without any detrimental effects.

Most important, however, is that the proposed product and method are adapted to low cost production of small numbers of boards. With the machine and the material under the control of an operator, the circuit pattern may be altered by manual manipulation of the insulating base during the sewing operation. In fact, the proposed method is ideally suited for manufacturing very limited quantities of circuit boards since no extra cost is incurred in changing the circuit pattern if the machine and material are operator controlled. A more sophisticated method, and one suitable for somewhat larger scale production, is to use a movable work table arranged to be responsive to conventional tape-controlled servomechanism or an electronic tracing apparatus. In such case, the circuit pattern and board size are readily alterable by substitution of control tapes or tracing patterns.

Thus it may be seen that the invention provides a reliable product manufactured at low cost, even when manufactured in small numbers, in which product a wide variety of inexpensive insulating materials may be utilized.

While one embodiment of the invention has been disclosed many modifications will be apparent, and it is intended that the invention be interpreted as including all modifications which fall within the true spirit and scope of the invention.

What is claimed is:

1. A circuit board including an insulating sheet and an electrical conductor thereon, said electrical conductor comprising a conductive strand sewed to the sheet in zigzag stitches and a conductive film connecting adjacent stitches.

2. A flexible board including a flexible insulating sheet and an electrical conductor thereon, said electrical conductor comprising a conductive strand sewed to the sheet in zigzag stitches and a conductive film connecting adjacent stitches.

3. A self-supporting circuit board including a rigid insulating sheet and an electrical conductor thereon, said electrical conductor comprising a conductive strand sewed to the sheet in zigzag stitches and a conductive film connecting adjacent stitches.

4. A circuit board including a paper or cloth insulating sheet impregnated with a thermosetting resin and an electrical conductor thereon, said electrical conductor comprising a conductive strand sewed to the sheet in zigzag stitches and a conductive metallic film connecting adjacent stitches.

5. The method of fabricating a rigid circuit board which comprises sewing an electrically conductive strand in zigzag stitches which define a prescribed circuit pattern to a flexible insulating sheet which includes partially cured thermosetting plastic material, curing said board to make it self-supporting, and subsequently applying a fluid conductive material to said board, said fluid conductive material solidifying to form conductive webs between adjacent stitches.

6. The method of fabricating a circuit board which comprises sewing an electrically conductive strand in zigzag stitches which define a prescribed circuit pattern to a flexible insulating sheet which includes partially cured thermosetting plastic material, applying a fluid conductive material to said board, said fluid conductive material solidifying to form conductive webs between adjacent stitches, forming the board into any desired shape, and curing said board so that it will retain that shape.

No references cited.